United States Patent [19]

DeAndrea et al.

[11] Patent Number: 5,796,781
[45] Date of Patent: Aug. 18, 1998

[54] DATA RECEIVER HAVING BIAS RESTORATION

[75] Inventors: John J. DeAndrea, Lawrenceville, N.J.; Keith M. Conroy, Philadelphia, Pa.

[73] Assignee: Technitrol, Inc., Trevose, Pa.

[21] Appl. No.: 417,239

[22] Filed: Apr. 5, 1995

Related U.S. Application Data

[63] Continuation-in-part of Ser. No. 89,973, Jul. 9, 1993, Pat. No. 5,533,054.

[51] Int. Cl.$^6$ ................................................ H04L 25/06
[52] U.S. Cl. ...................... 375/288; 375/229; 375/258; 375/319; 326/60
[58] Field of Search .......................... 375/219–220, 375/229, 257–258, 286–288, 317–319; 326/60; 327/331, 333; 333/177, 180; 341/56–57, 70–71, 76–77, 143

[56] References Cited

U.S. PATENT DOCUMENTS

| | | | |
|---|---|---|---|
| 3,649,751 | 3/1972 | So | 375/286 |
| 3,798,544 | 3/1974 | Norman | 375/286 X |
| 3,906,174 | 9/1975 | Dotter, Jr. | 375/224 X |
| 3,925,611 | 12/1975 | Dennis | 375/286 X |
| 3,993,593 | 11/1976 | Lender et al. | 375/291 |
| 4,078,157 | 3/1978 | Lender et al. | 375/319 X |
| 4,086,587 | 4/1978 | Lender | 341/56 |
| 4,234,898 | 11/1980 | Nakagawa et al. | 360/41 |
| 4,355,397 | 10/1982 | Stuart | 375/286 |
| 4,464,765 | 8/1984 | Shimizu | 375/258 X |
| 4,475,212 | 10/1984 | McLean et al. | 375/286 |
| 4,665,531 | 5/1987 | Aly | 375/286 |
| 4,717,896 | 1/1988 | Graham | 333/25 |
| 4,821,295 | 4/1989 | Sanner | 327/239 |
| 5,113,159 | 5/1992 | Adriaenssens et al. | 333/12 |
| 5,119,402 | 6/1992 | Ginzburg et al. | 375/288 |
| 5,173,618 | 12/1992 | Eisenstadt | 375/360 |
| 5,280,500 | 1/1994 | Mazzola | 341/56 |

FOREIGN PATENT DOCUMENTS

| | | |
|---|---|---|
| 0299639 | 1/1989 | European Pat. Off. |

OTHER PUBLICATIONS

Mazzola, Mario, "A Proposal for Low–Cost FDDI UTP/STP PMD Standard", ANSI X3T9.5 TP–PMD working group document #TP–PMD–078, Oct. 15, 1991, 32 sheets.

Mazzola, Mario, "Implementation Issues in an MLT–3 Based TP–PMD", ANSI X3T9.5 TP–PMD working group document #TP–PMD–128, Apr. 29, 1992, 17 sheets.

Mazzola, Mario, Crescendo Communications MLT–3 Receiver Circuit Diagram, ANSI X3T9.5 T–PMD working group document #TP–PMD–152, Jun. 8, 1992, 2 Sheets.

Synoptics Corp., "FDDI –UTP –Investigation", ANSI X3T9.5 TP–PMD working group document #TP–PMD–084, Oct. 15, 1991, 6 sheets.

Banwell, T.C., "Bit Error Characteristics of Correlated Three Level Coding", ANSI X3T9.5 TP–PMD working group document #TP–PMD–146, Oct. 14, 1992, 6 sheets.

Banwell, T.C., MLT–3 vs. NRZ1 Testing results, ANSI X3T9.5 TP–PMD working group document #TP–PMD–181, Jun. 24, 1992, 6 sheets.

Eugen Gerthon, "FDDI on Copper With AMD PHY Components", Advanced Micro Devices, 1991, 8 sheets.

"The X3T9.5 Copper FDDI Station", Advanced Micro Devices, pp. 3–4, A–6, A–7.

IBM Technical Disclosure Bulletin, vol. 6, No. 9, Feb. 1964.

*Primary Examiner*—Young T. Tse
*Attorney, Agent, or Firm*—Dann, Dorfman, Herrell & Skillman, P.C.

[57] ABSTRACT

A data received is provided with DC restoration circuitry for correcting the DC level of received multi-level data signals. A DC shift detection circuit detects whether the received DC level multi-level signals has shifted due to a predominance of one of the data levels in the data stream. A correction circuit responds to the shift detection circuit by applying a corrective bias to an isolation transformer. Alternatively, the correction circuit applies a corrective bias to the received signals within the receiver circuit.

22 Claims, 7 Drawing Sheets

DATA RECEIVER HAVING BIAS RESTORATION

CROSS-REFERENCE TO RELATED APPLICATION

This is a continuation-in-part of U.S. application Ser. No. 08/089,973 filed Jul. 9, 1993, now U.S. Pat. No. 5,533,054.

FIELD OF THE INVENTION

The present invention relates to high speed telecommunications and data communication. More particularly, the invention relates to a high speed data transceiver for receiving and transmitting data via an electric current conducting medium, such as unshielded twisted pair cable, at data rates equivalent to fiber optic transmission media and with improved signal equalization.

BACKGROUND

In order to meet the demand for ever-increasing data transmission rates, while ensuring that various kinds of equipment, such as networked computing equipment, can communicate with one another, new standards for high speed data transmission are continually being developed. For example, data networks operating in accordance with the fiber-distributed-data-interface (FDDI) standard, fiber channel, Asynchronous Transfer Mode (ATM), Synchronous Optical Network (SONET), Synchronous Digital Hierarchy (SDH), High Speed Ethernet or Higher Speed Token Ring Standard and their derivatives are capable of transmitting data at line rates of 16 Mb/s up to the Gigabit/s region via optical fiber.

However, the ongoing evolution of high speed data transmission systems poses a dilemma for owners of older equipment. Many distributed data systems utilize electric current carrying media, e.g., copper wire, for data communication. Such conductive media include coaxial cable, shielded-twisted pair cable (STP), or unshielded twisted pair cable (UTP). In metallic conductor-based networks, data transmission rates on the order of 16 Mb/s are known. To obtain data transmission rates on the order of those available via optical fiber communication, it has heretofore been necessary to replace the metallic conductors with optical fibers. Upgrading a metallic conductor-based network to an optical fiber-based network can be prohibitively expensive because of the cost of replacing cables and connectors.

In view of the foregoing, it would be desirable to have a device by which computing equipment could transmit and receive data at the high data rate provided by FDDI over traditional, metallic conductive media in order to avoid the expense and effort required to replace such media with optical fibers. However, such a goal is not readily achieved.

In order to transmit and receive data via a conductive medium, there are several constraints which must be satisfied. These constraints include maintaining electromagnetic emissions from the metallic conductors and associated components within permissible limits, minimizing the influence of interfering electromagnetic signals upon the data signals on the metallic conductors, compensating for distortion of the received signals that results from the transmission line characteristics of the conductive medium, and regenerating useful logic signals from the received signals.

Since metallic conductive media radiate electromagnetic energy, it is desirable to minimize the radiated energy in order to reduce signal loss and to reduce electromagnetic emissions. Emission reduction is of particular importance since regulatory authorities, such as the United States Federal Communication Commission, prescribe limitations upon the amount of power which may be radiated from computing equipment within particular frequency bands in order to prevent interference with other electronic devices. Methods have been developed to reduce the bandwidth required for transmitting digital signals at a given bit rate, to distribute the radiated power across a wide region of the spectrum so that the average power in any one region is below the prescribed limit, and to confine electromagnetic fields to the conductive medium.

Line coding techniques are used to reduce the bandwidth required to transmit serial data. The serial data may contain undesirable spectral peaks because of the presence of embedded timing signals or predefined bit sequences that are used for such functions as flow control and/or providing status information. In order to eliminate these undesirable peaks, a scrambler is used to randomize the serial data signal. The scrambler operates according to a deterministic scrambling algorithm so that the serial signal can be easily recovered from the scrambled signal. The resulting scrambled signal may then be converted to a multi-level format, such as a pseudoternary format wherein the polarity of successive low-to-high logic level transitions is reversed in order to lower the fundamental Fourier component of the scrambled signal.

The simplest approach to confining electromagnetic emissions is to use a shielded cable wherein a grounded metallic shield surrounds the conductors. Such shielded cable is often provided in the form of co-axial cable or as shielded twisted pair (STP) cable. The grounded metallic shield introduces a parasitic, distributed capacitance which attenuates signals transmitted over the conductors. However, shielded cable is less flexible and more expensive than unshielded twisted pair (UTP) cable.

In order to reduce electromagnetic emissions from UTP cable, a balanced, or differential, signal format is commonly used. A differential signal is one in which a voltage transition applied to one of the conductors is accompanied by a complementary transition applied to the other conductor. Ordinarily, the voltage transitions on each conductor are singly, or independently, compared to a reference level, such as ground at the receiving end of the cable. The reference voltage level, or baseline, can fluctuate as a result of a prolonged signal sequence having a non-zero average value. Additionally, the received differential signal often includes a common mode voltage signal which may be induced in the conductors by another source of interference along the cable route.

All electrically conductive media cause various types of distortion in a transmitted signal. Two common types of such distortion are amplitude dispersion and phase dispersion. Amplitude dispersion is the attenuation of the amplitude of the transmitted signal at a loss factor that varies with signal frequency and cable length. Phase dispersion is the propagation of signals at a speed which also varies with signal frequency and cable length. Since a digital signal is composed of a large number of frequency components, both of these dispersive effects limit the distance over which and the data transmission rate at which a cable may effectively transmit data.

In order to receive useful data from a signal transmitted over a metallic conductive medium, it is often necessary to equalize the received signal, or to compensate for the signal distortion caused by the transmission characteristics of the cable. The known equalizing circuits employ an amplifying circuit having gain and phase characteristics that vary in inverse proportion to the gain and phase characteristics of the transmission medium. The type of equalization that has been heretofore proposed for high-speed digital communication over a metallic conductor is an adaptive equalization system wherein the equalizing characteristic is automatically and continuously adjusted via a feedback loop that monitors a particular quality of the received signal, such as the average peak-to-peak voltage. The monitored average peak-to-peak voltage is also used as a reference level against which a received pseudoternary signal is compared in order to regenerate the original binary signal.

Adaptive equalization and conversion circuits possess several disadvantages in the context of high-speed conductive digital receivers. One disadvantage is that the feedback loop necessarily introduces a finite delay, or adaptation time, into the equalization process. In the reception of broadband signals, adaptation delay can cause significant distortion of the signal rather than the desired correction of transmission distortion. Another disadvantage of the known adaptive equalizing circuits is that they are susceptible to errors that result from the presence of common mode voltages on the differential input lines. Since the conversion from differential pseudoternary to binary is effected by comparing amplified versions of the individual differential signals with a time-averaged peak-to-peak value of the received signal, common mode components of the received signal are amplified and compared to an average signal value that is no longer relevant to the instantaneous signal. Crosstalk from adjacent signal transmission lines or other sources of noise can cause false adaptation in equalizers that are sensitive to variations in peak-to-peak voltage.

SUMMARY OF THE INVENTION

In accordance with one aspect of the present invention there is provided a transceiver, having a receiver section and a transmitter section, by which a particular piece of equipment receives or transmits digital data over an electrically conductive media at a data transmission rates that is compatible with the data transmission rates employed in digital fiber optic networks.

In accordance with another aspect of this invention there is provided a receiver section that receives a line-coded differential multi-level input signal via an isolation transformer. The isolation transformer incorporates a pair of grounded windings that are intertwined with respective primary and secondary windings in order to reduce electromagnetic emission and to reduce capacitive coupling within the transformer. Common mode signal rejection is enhanced within the receiver section through the use of a code conversion circuit having complementary differential inputs. The code conversion circuit decodes the multi-level signal into a differential binary signal. An amplifier receives the differential binary signal and produces a logic level signal in response thereto.

Partial equalization of the signals is performed within the receiver section before and/or after code conversion. A non-linear, or switched, equalizer is used to provide additional high frequency equalization in order to extend the range of cable lengths with which the transceiver module can be used effectively. The combination of passive equalization and non-linear equalization provides improved adaptive equalization of the signal.

In order to compensate for undesirable shifts in the DC level of received data signals, a DC restoration circuit is provided, and includes a monitoring circuit for monitoring the average level of the received signal. In one embodiment, the monitoring circuit is connected to a control winding of the isolation transformer to provide a corrective magnetic flux signal within the core of the isolation transformer. In an alternative embodiment, the monitoring circuit is connected to a signal level correction circuit for applying a corrective bias to the received data signals.

The transmitter section of the invention includes a balanced binary-to-multi-level conversion circuit for producing a balanced, symmetric multi-level signal in response to a binary input signal.

BRIEF DESCRIPTION OF THE FIGURES

Other features and advantages of the invention shall be made apparent in the following detailed description in which.

DETAILED DESCRIPTION OF THE PREFERRED EMBODIMENTS

Figure 1A:
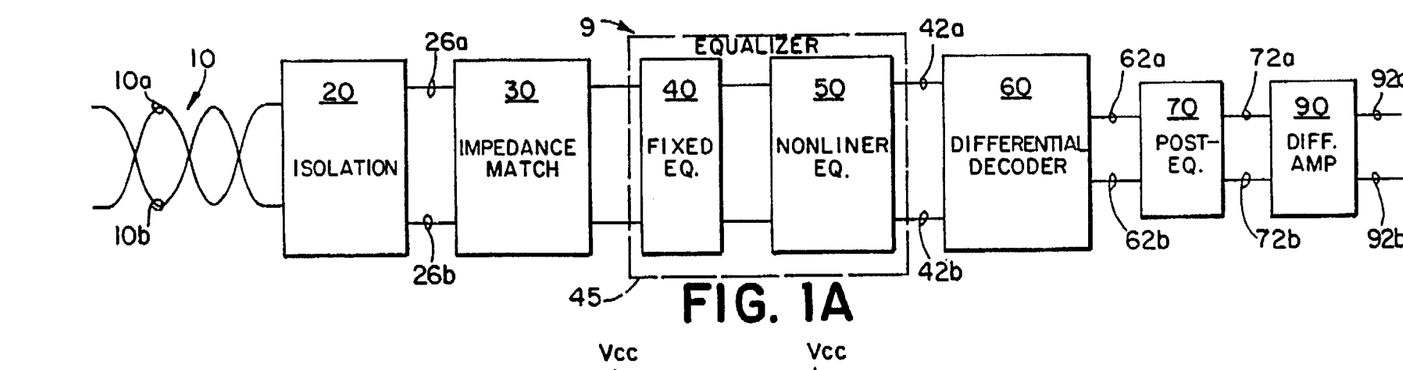
FIG. 1A is a functional block diagram the receiver section of the high speed data transceiver according to the present invention.

Referring now to FIG. 1A there is shown a block diagram of a receiver circuit 9 for receiving a data signal from a conductive cable 10 and producing a converted data signal having a desired logic level at terminals 92a and 92b. In the embodiment shown, the conductive cable 10 is an unshielded twisted pair cable comprising two intertwined conductors 10a and 10b, although other types of cables such as coaxial or STP can be used. The data signal carried on the conductive cable 10 is preferably a pseudoternary line-coded signal having a peak-to-peak voltage on the order of 2 Volts. An isolation stage 20 of the receiver 9 includes a transformer for isolating the receiver 9 from the cable 10. The isolation stage 20 provides an isolated signal at terminals 26a and 26b.

An impedance-matching network 30 is connected across terminals 26a and 26b in order to match the effective load impedance of the receiver 9 to the impedance of the conductive cable 10 and thereby provide maximum power transfer to the receiver 9 and prevent reflection of the received signal.

The impedance-matching network 30 provides the input signal to an equalizing network 45. The equalizing network 45 preferably includes a fixed equalizer 40 which provides partial compensation for distortion of the received signal that may be present due to transmission of the signal via conductive cable 10. The equalizing network 45 does not necessarily provide complete equalization of the received signal. For example, if a broad spectrum signal is fully equalized using only passive components, the resulting relative attenuation of the lower frequencies would be too large to permit efficient rectification of the differential signal. The equalizing network 45 includes two fixed, single-pole filters that are each connected in series with respective terminals 26a and 26b.

The high frequency components of a signal received from a short cable, such as a 1 meter cable or a direct connection of the receiver 9 to a signal source, will be considerably less attenuated than the high frequency components of a signal received from a 125 meter cable. It is therefore difficult to select appropriate component values for the filters in the equalization network 45 that will provide adequate compensation for longer cables without unduly overcompensating the high frequency portion of the signal received from shorter cables. Such overcompensation of less attenuated signals can lead to pulse width distortion and jitter in the output signal at terminals 92a and 92b. A non-linear, or switched equalization network 50 may be utilized within the equalizing network 45 in order to eliminate undesirable overcompensation. The non-linear equalization network provides attenuation of high frequencies in a manner that is dependent upon the amplitude of the received signal.

The equalizing network 45 provides an equalized multi-level signal to a differential decoder 60 via terminals 42a and 42b. The differential decoder 60 converts the multi-level signal into a differential binary signal. The differential decoder 60 includes a differential switching network which provides effective differential rectification of a multi-level signal, such as a pseudoternary signal. The differential decoder 60 provides a differential binary signal at terminals 62a and 62b.

A second equalizer 70 is connected with terminals 62a and 62b to provide additional compensation for signal distortion. The second equalizing network 70 provides enhanced equalization of the signal present at terminals 62a and 62b in order to accentuate the high frequency components of the differential binary signal relative to the lower frequencies at a ratio beyond that which would be practical prior to rectification as has been discussed herein in connection with the equalizing network 45.

The equalized differential binary signal at terminals 72a and 72b of the second equalizing network 70 is input to a logic level conversion stage 90. The logic level conversion stage converts the differential binary signal into a desired logic level for the computing device which is to receive the data.

Figure 1B:
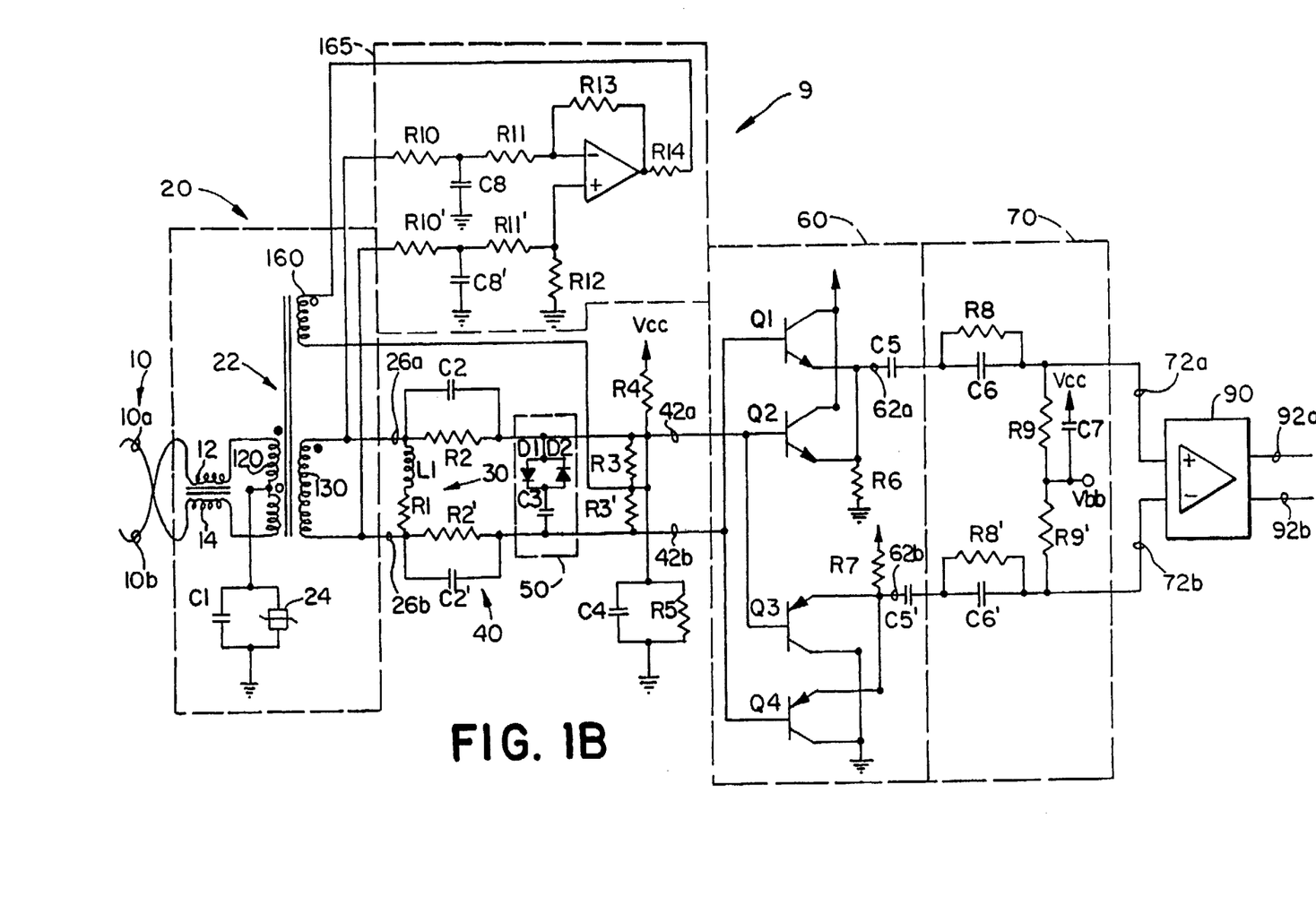
FIGS. 1B and 1C are schematic diagrams of component circuits of a preferred embodiment of the receiver section shown in FIG. 1A.

A preferred arrangement of the receiver 9 is shown in more detail in FIG. 1B. The isolation stage 20 includes a pair of longitudinal chokes 12 and 14 having terminals attached in series to conductors 10a and 10b respectively. The other terminals of longitudinal chokes 12 and 14 are connected to respective primary terminals of a transformer 22. The longitudinal chokes 12 and 14 in combination with the transformer 22 serve to isolate subsequent stages of the receiver 9 from common mode components of the signal present on the conductive cable 10. In the preferred embodiment, each of the longitudinal chokes 12 and 14 has an inductance of 20 μH and the transformer 22 has a turns ratio of 1:1. For additional common mode rejection, transformer 22 has a primary center tap connected to ground through a capacitor C1. Protection against surge signals, such as electrostatic discharges, is provided in the form of a threshold voltage conduction device 24 connected in parallel with capacitor C1.

In the embodiment shown in FIG. 1B, the impedance-matching stage and the fixed equalization stage of the receiver 9 are provided by a passive network which includes an inductor L1 connected in series with a resistor R1 across terminals 26a and 26b, a resistor R2 in parallel with a capacitor C2 connected in series with terminal 26a, and a resistor R2' in parallel with a capacitor C2' connected in series with terminal 26b. The effective time constants of the combined impedance matching and fixed equalization stage are also influenced by a bias network discussed in further detail hereinbelow and including resistors R3 and R3' connected in series across terminals 26a and 26b, a resistor R4 connected between Vcc and the common connection of resistors R3 and R3', a resistor R5 connected between ground and the common connection of resistors R3 and R3' and a capacitor C4 connected in parallel with resistor R5.

In the preferred embodiment, L1 is a 100 nH inductor and R is a 75 Ω resistor. The combination of L1 and R1 provides a high-pass filter which serves to attenuate low frequency components of the received signal. Additional high-pass filtering is performed upon the signal present at terminals 26a and 26b by the combinations of R2 and C2, and by R2' and C2' respectively. R2 and R2' may be 200 Ω resistors and C2 and C2' may be 130 pF capacitors. Other values may be selected as desired for the particular application for which the receiver 9 is employed. These filters provide a partially equalized signal upon terminals 42a and 42b.

Terminals 42a and 42b are connected to the differential decoder stage 60, which is embodied as a differential full-wave rectifier. The differential decoder 60 effectively converts the differential pseudoternary signals at terminals 42a and 42b into differential binary signals which are provided at terminals 62a and 62b of the differential decoder 60. The effect of this conversion is illustrated in FIGS. 2A–2D.

Figures 2A, 2B:
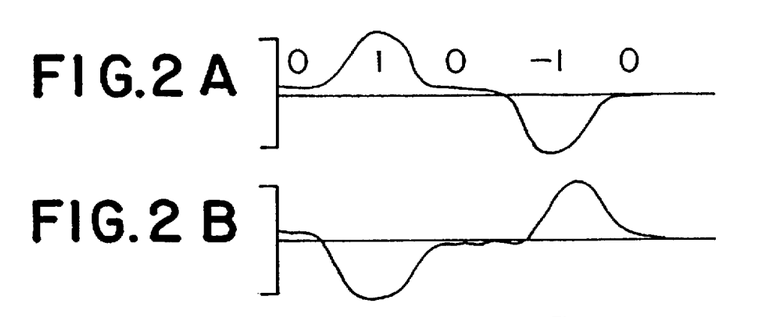
FIGS. 2A–2D are graphs of electrical signals illustrating a signal conversion process performed by the receiver section of FIG. 1A.
Figure 2C:
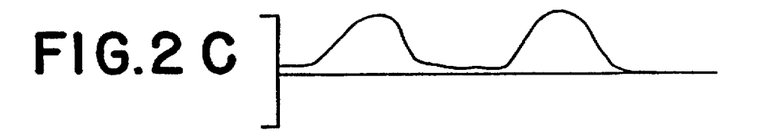
Figure 2D:
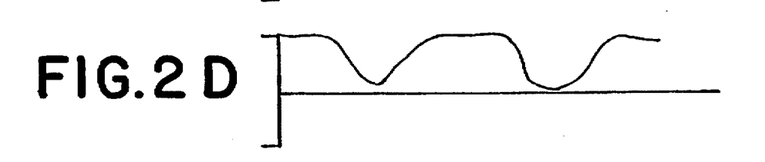

In FIG. 2A there is shown a representative pseudoternary waveform for the sequence {0,1,0,–1,0} as may be present terminal 42a. The designation {0,1,0,–1,0} is used for explanatory purposes. The actual serial data represented by the signal shown in FIG. 2A may be other than the digits 0,1,0,–1,0 depending on the type of line coding employed. FIG. 2B shows the corresponding waveform at terminal 42b. The differential binary output waveforms provided by differential decoder 60 at terminals 62a and 62b are shown in respective FIGS. 2C and 2D. The waveform at terminal 62a exhibits transitions from ground to Vcc upon each 0-to-1 transition of the differential pseudoternary signal. The waveform terminal 62b exhibits complementary transitions from Vcc to ground upon each 0-to-1 transition of the differential pseudoternary signal. Thus, the waveforms present at terminals 62a and 62b constitute a differential binary signal that is confined between Vcc and ground.

Referring again to FIG. 1B, the differential decoder 60 includes a switching network comprising two complementary pairs of bipolar junction transistors. NPN transistors Q1 and Q2, and PNP transistors Q3 and Q4. Terminal 42a is connected with the base of NPN transistor Q2 and with the base of PNP transistor Q3. Terminal 42b is connected with the base of NPN transistor Q1 and with the base of PNP transistor Q4. The collectors of NPN transistors Q1 and Q2 are both connected to Vcc. The emitters of NPN transistors Q1 and Q2 are connected to ground via resistor R6 which may be a 1 KΩ resistor. The voltage signal upon terminal 62a increases whenever the forward bias of the emitter-base junctions of either Q1 or Q2 increases. Such an increase in bias occurs whenever the voltage terminal 42a increases or whenever the voltage terminal 42b increases. Since the signals at terminals 42a and 42b constitute a differential pseudoternary signal, the resulting voltage at terminal 62a will respond positively to both the positive and negative excursions of the pseudoternary signal as described in connection with FIGS. 2A–D.

The emitters of PNP transistors Q3 and Q4 are connected to Vcc via resistor R7 which may be a 1 KΩ resistor. The collectors of PNP transistors Q3 and Q4 are grounded. It can be seen that the voltage at terminal 62b will decrease whenever the forward bias of the emitter-base junctions of either Q3 or Q4 increases. Such an increase in bias occurs whenever the voltage at terminal 42a decreases or whenever the voltage at terminal 42b decreases. Thus, the resulting voltage at terminal 62b will respond negatively to both the positive and negative excursions of the pseudoternary signal as described in connection with FIGS. 2A–D. In the embodiment of FIG. 1B, the decoder stage 60 is effective to convert pseudoternary signal into a differential binary signal. It is noted that in alternative embodiments utilizing multi-level signals having 2N–1 levels where N>2, multiple cascaded decoder stages such as decoder stage 60 may be employed. In such embodiments, each decoder stage is effective to convert a 2N–1 level signal to a 2N–3 level signal with the final stage of the cascade providing a differential binary signal.

A bias network is incorporated into the first equalizing network 45 for providing an appropriate DC bias to the transistors Q1–Q4. The bias network includes two resistors R3, R3' in series across terminals 42a and 42b. The common connection of resistors R3, R3' is connected to Vcc via resistor R4 and to ground via resistor R5. Preferred values for these resistors are 100 Ω for R3 and R3', and 510 Ω each for R4 and R5. A decoupling capacitor C2, such as a 0.1 µF capacitor, is provided in parallel with resistor R5 in order to provide a ground path for stray transient signals. It can be seen that the DC bias applied to the bases of transistors Q1–Q4 is determined by the entire DC equivalent presented to the bases of the transistors Q1–Q4. Thus, the value of resistors R2, R2' may be chosen according to the desired time constant of the fixed equalizer 40 and the desired transistor bias voltage. The values of resistors R3, R3' also influence the transfer characteristic of the small-signal equivalent circuit presented to the secondary terminals of the transformer 22.

The differential binary signal at terminals 62a and 62b is input to the second equalizing network 70 via a pair of DC-blocking capacitors C5, C5' in series with respective terminals 62a and 62b. The capacitors C5, C5', preferably 0.1 µF each, isolate the second equalizing network 70 from any DC voltage levels present at the emitters of transistors Q1–Q4 and pass the differential binary signal. The second equalizing network 70 preferably includes two fixed, single-pole filters that are each connected in series with the respective DC-blocking capacitors C5, C5'. Each of the filters in equalizing network 70 includes a resistor R8 in parallel with a capacitor C6 and a pair of resistors R9 and R9' connected in series across terminals 72a and 72b of the second equalizing network. Preferably, R8 is a 510 Ω resistor, C2 is a 15 pF capacitor, and R9 and R9' are 200 Ω resistors.

A logic level conversion stage 90 includes a limiting differential amplifier suitable for providing a binary signal compatible with ECL (emitter-coupled logic) circuitry. The limiting differential amplifier is preferably constructed using cascaded stages of a Motorola MC10116 Triple Line Receiver integrated circuit. The resistors R9, R9' may be provided with a bias adjust terminal Vbb at the common connection thereof to provide a DC bias if such a bias is required by the differential amplifier in logic level conversion stage 90.

In order to receive and convert differential pseudoternary signals from cables of varying length (e.g., from 0 meters to 125 meters) with a single receiver circuit, the receiver circuit 9 is preferably provided with an additional equalizing filter having a non-linear equalization characteristic relative to the signal amplitude at terminals 42a and 42b. The nonlinear equalizer 50 includes a pair of threshold voltage conduction devices such as Schottky diodes D1 and D2 which are connected in parallel with opposing polarities. The parallel combination of diodes is connected in series with a capacitor C3 which is preferably a 35 pF capacitor. The effect of this arrangement, in combination with the other components of the equalization and impedance-matching network, is to provide low pass filtering of the signal upon terminals 42a and 42b whenever the transient voltage between terminals 42a and 42b exceeds the threshold voltage of one of the diodes D1 or D2. The non-linear equalization network 50 may alternatively employ field-effect transistors or other non-linear switching devices to achieve a similar result.

Figure 1C:
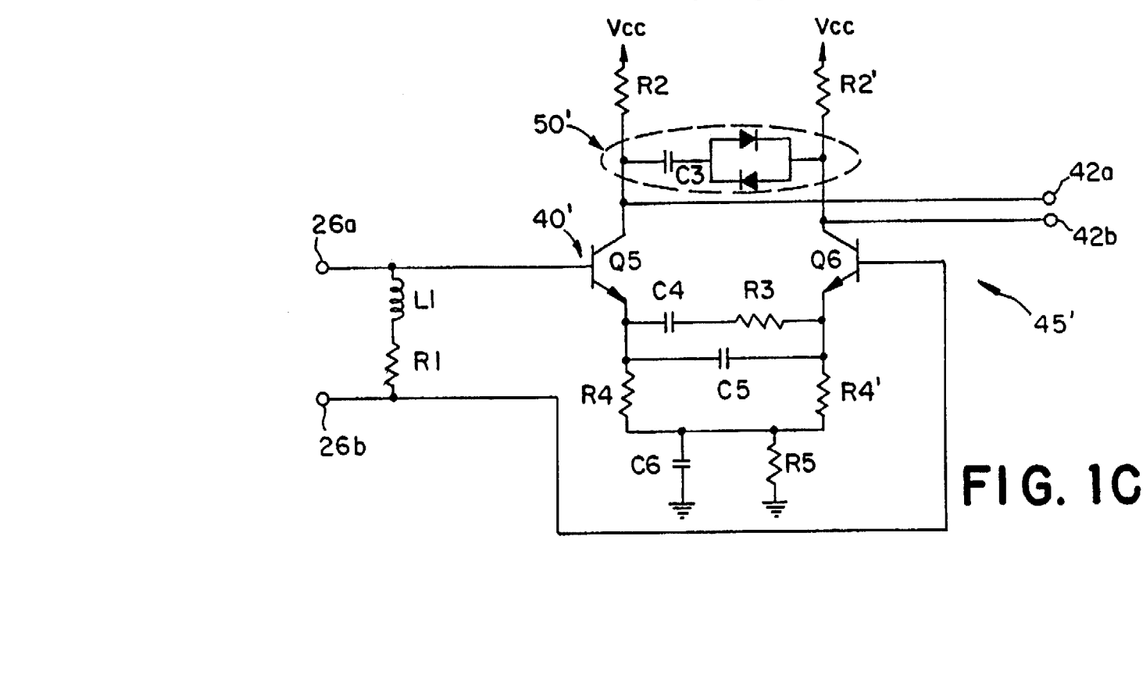

Another embodiment of the equalization network 45 is shown in FIG. 1C. The equalization network 45' provides amplification as well as equalization of the signal at terminals 26a and 26b. A pair of NPN transistors Q5 and Q6 are configured as a differential amplifier each having a two-pole filter connected within in their respective emitter bias circuits. Terminal 26a is connected with the base of transistor Q5 and terminal 26b is connected with the base of transistor Q6 in order to provide differential equalization and amplification of the signals received on each of terminals 26a and 26b. Suitable component values for use in the amplifying equalizer 45' as shown in FIG. 1C are 300 Ω for R3, R4, R4', and R5; 200 Ω for R2; 10 pF for C5; and 20 pF for C4. The equalizer 45' may also include a non-linear, or switched, equalization capability in the form of filter 50' which operates similarly to filter 50 described in connection with FIG. 1B.

Figure 3:
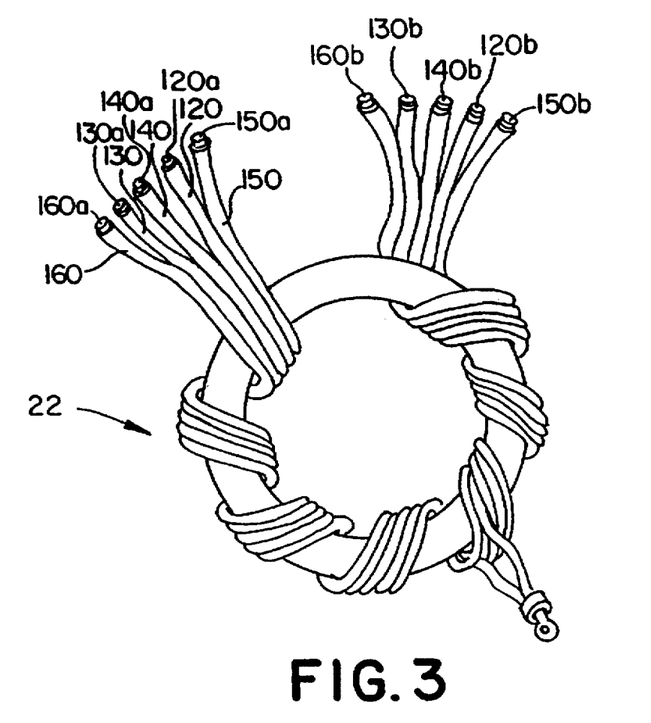
FIG. 3 is a perspective view of the windings of an inductive device used in the receiver section of FIG. 1A.

Referring now to FIG. 3, there is shown a preferred construction of the transformer 22 of FIG. 1B. Preferably, the transformer core is a toroid having an outer diameter of 0.155" and an inner diameter of 0.087". The magnetic path length of the core is preferably 0.97 cm with a cross-sectional area of 0.011 cm$^2$ and a relative permeability of about 7500. The primary wire 120 includes terminals 120a and 120b. The primary wire 120 is wound ten times upon the transformer core, connected to a center tap 120c, and then wound ten more times. The secondary wire 130, which includes terminals 130a and 130b, is wound twenty times upon the transformer core to provide a turns ratio of 1:1.

Isolation transformers used to couple digital signals into receiver circuit 9 can be a source of undesirable electromagnetic emissions. Additionally, high-frequency capacitive coupling between the individual windings of the transformer can reduce the efficiency of the transformer. In order to reduce these undesirable effects, two shielding wires 150 and 140 are wound upon the transformer cores as follows. The shielding wire 150 is wound upon the transformer core adjacent to the windings of the primary wire 120 so that each turn of the primary wire 120 is adjacent to respective turns of the shielding wire 150. The shielding wire 140 is wound upon the transformer core adjacent to the windings of the secondary wire 130 so that each turn of the secondary wire 130 is adjacent to respective turns of the shielding wire 140. When the transformer is connected within a receiver circuit, the primary terminals 120a and 120b are connected with the incoming data signal cable and the secondary terminals 130a and 130b are connected within the receiver circuit as described in connection with FIG. 1B. The terminals 140a and 140b of the shielding wire 140 and the terminals 150a and 150b of the shielding wire 150 are all connected to ground. The grounded shielding wires 140 and 150 serve to confine electromagnetic fields within the transformer 112 that would otherwise contribute to electromagnetic emissions or capacitive coupling between turns of the primary or secondary coils.

Figure 6:
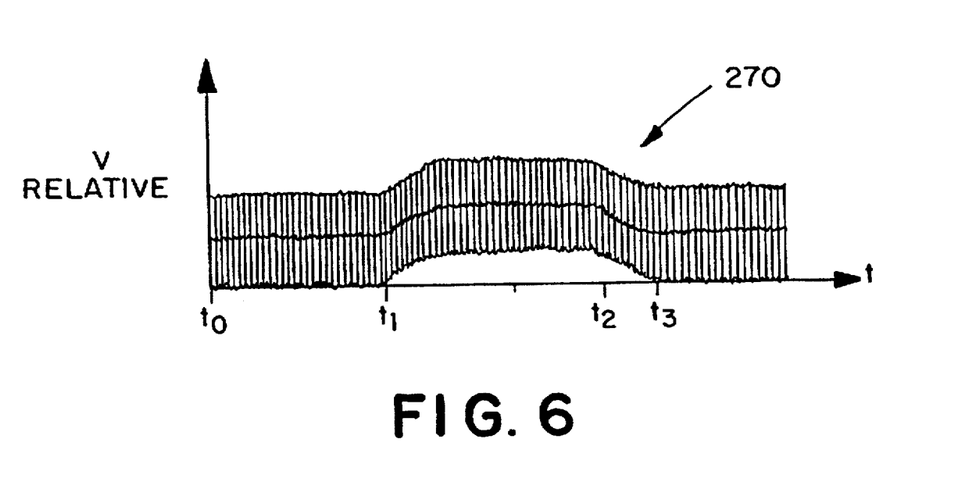
FIG. 6 is a graph of a received data signal waveform having a DC level shift.

An undesirable DC voltage may be presented at the secondary terminals during a prolonged non-zero average value of the incoming data signal. FIG. 6 illustrates the effect of such a non-zero average value upon the signal at terminal of 42a of the receiver circuit, which is one side of the differential pseudoternary signal provided to the differential decoder 60. The time base of the waveform 270 is large relative to the period of an approximately 125 MHz pseudoternary data signal received from the twisted pair 10. From time $t_0$ to time $t_1$, the distribution of ones and zeros in the received signal is approximately equal, and the waveform 270 oscillates between relatively stable maximum and minimum levels. Beginning at time $t_1$, and extending until time $t_2$, a predominance of high level excursions in the received signal causes the waveform 270 to exhibit an upward shift in voltage. After time $t_2$, the average value of the received signal returns to zero, and the waveform 270 shifts downward, during the interval between $t_2$ and $t_3$, to return to the original maximum and minimum levels. The other half of the differential pseudoternary signal at terminal 42b (not shown) will likewise exhibit a shift of similar magnitude in the direction of decreased voltage during the interval between $t_1$ and $t_2$. The time interval between $t_2$ and $t_3$ that is required for the waveform 270 to return to its normal limits is determined by the low frequency response characteristic of the isolation transformer.

An undesirable effect of the relative upshift and downshift in the data signals provided at terminals 42a and 42b, is to cause pulse width distortion in the differential binary signal that is produced by the differential decoder 60. One way to restore the desired DC bias in the receive signal is to apply a correction signal to the core of the isolation transformer. For example, the receiver circuit of FIG. 1B includes a DC restoration circuit 165 for monitoring the average value of the receive signal and for generating a DC correction current in response to the monitored average value. Referring again to FIG. 3, a control winding 160, including terminals 160a and 160b, may be wound upon the core as shown. The control winding 160 allows the DC restoration circuit to apply sufficient current to the winding 160 in order to counteract the effects of undesirable DC levels within the secondary winding 130.

Referring now to FIG. 1B, the DC restoration circuit 165 may include an averaging amplifier, or signal detection circuit, connected with the signal-carrying conductors of the receiver circuit in order to modulate the control winding current in accordance with the average DC level of the detected signal. The resistors R10, R10' are preferably relatively large, such as 10K Ω, so that the DC restoration circuit does not load the impedance-matching and equalization network. The capacitors C8, C8' may be 0.1 μF capacitor for storing the average signal level for a sufficient period of time. The resistors R11 and R13 serve to set the gain of the DC restoration circuit so that the correction current is of a suitable magnitude depending upon the characteristics of the transformer 22 and the control winding 160. A gain on the order of 10 has been found to be sufficient for the signal values and transformer characteristics described herein. A current limiting resistor R14, such as a 510 Ω resistor, determines the range of current that will be applied to the control winding.

Figure 7:
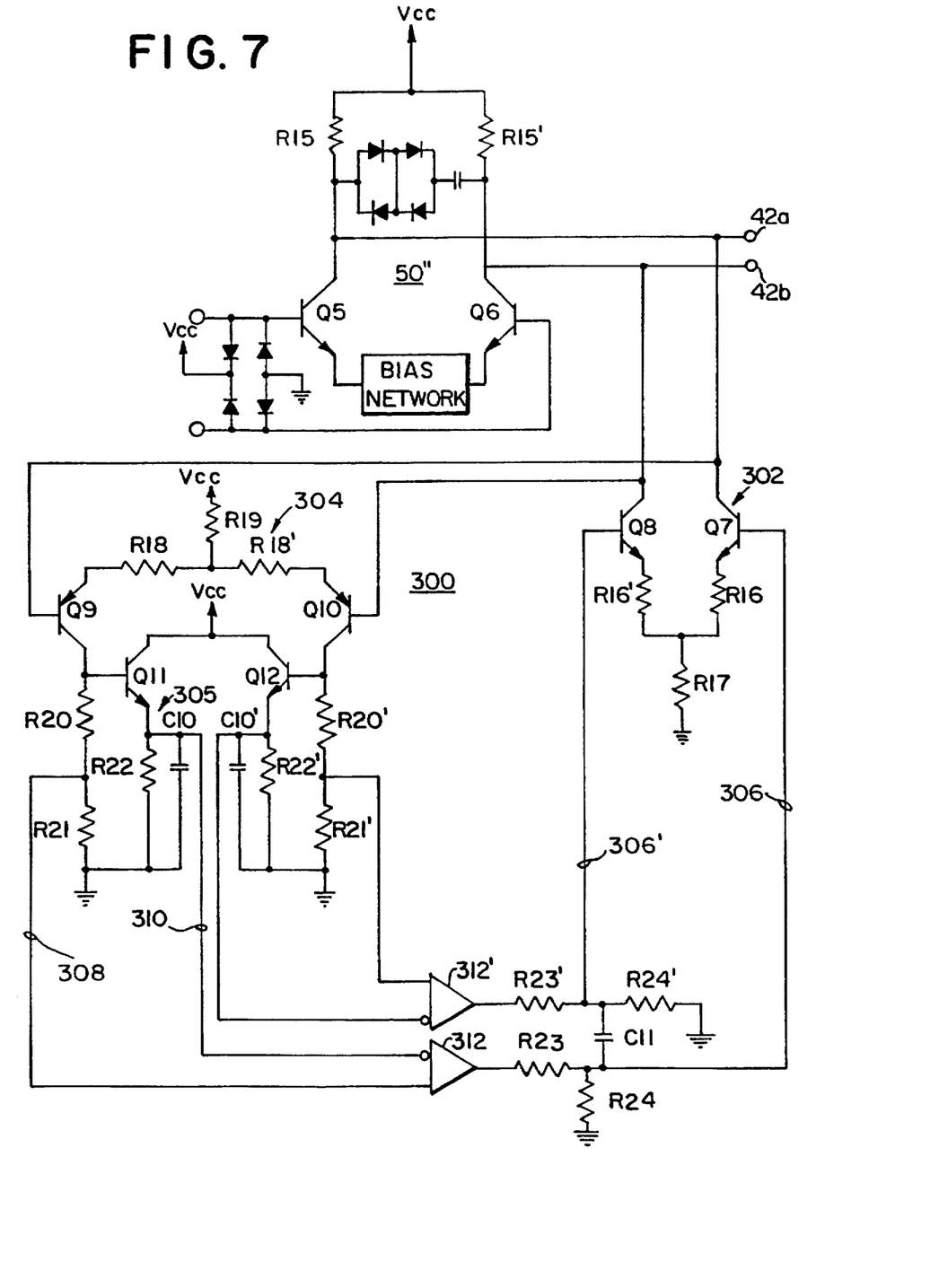
FIG. 7 is a schematic diagram of a DC restoration circuit for correcting the DC level shift of a received signal such as that shown in FIG. 6.

A possible disadvantage of using a DC restoration circuit to provide a counteracting flux within the core of the isolation transformer is that the required magnitude of the control current, relative to the average level of the receive signal, depends upon the magnetic characteristics of the core and to inductance of the coils wound upon the core. Since these factors are subject to variations due to manufacturing tolerances, it may be preferable to compensate for the effect of non-zero average received signal levels electronically, rather than magnetically. For example, there is shown in FIG. 7, a DC restoration circuit 300 comprising a signal level correction circuit 302 for correcting the baseline levels of the differential pseudoternary signals, and a DC shift detection circuit 304 for detecting a change in the DC levels of the differential pseudoternary signals and for activating the correction circuit 302.

The DC restoration circuit 300 is connected to terminals 42a and 42b, which conduct the respective complementary sides of the differential pseudoternary signal between the equalizer 45 and the differential decoder 60. As shown in FIG. 7, the last stage of the equalizer 45 includes an alternative non-linear equalization network 50" relative to that shown in FIG. 1C. The equalization network 50" provides the two sides of the differential pseudoternary signal at respective connections to terminals 42a and 42b between transistor Q5 and resistor R15 and between Q6 and resistor R15" (where R15 and R15" are preferably 300 Ω). The DC restoration circuit 300 is symmetric with respect to its treatment of signals at terminals 42a and 42b. The operation of the restoration circuit 300 upon the signal presented at terminal 42a, which is typical, will now be described.

Terminal 42a is connected to the collector of transistor Q7 of the signal level correction circuit 302. The base of transistor Q7 receives a correction signal, via conductor 306, from the shift detection circuit 304. When the correction signal or conductor 306 is asserted, the transistor Q7 becomes conductive, and the voltage of terminal 42a is consequently reduced by the voltage divider that is established between R15 and the resistors R16 and R17 (preferably 150 Ω and 510 Ω, respectively) which are connected between the emitter of transistor Q7 and ground.

The function of the shift detection circuit 304 is to assert the correction signal on conductor 306 whenever a shift in the DC level of the pseudoternary signal on conductor 42a is detected. As used herein, the term DC level shift is defined to include a change in the maximum, minimum, or average value of the pseudoternary signal occurring on a time scale that is larger than the data rate of the pseudoternary signal. In the embodiment of FIG. 7, the shift detection circuit is arranged to detect a change in the minimum levels of the respective sides of the differential pseudoternary signal on conductors 42a and 42b.

Terminal 42a is connected to the base of a PNP transistor Q9 of the shift detection circuit 304. The transistor Q9 isolates the shift detection circuit 304 from conductor 42a and provides inverting amplification of the pseudoternary signal present at terminal 42a. The emitter of transistor Q9 is connected, via resistors R18 and R19 (preferably both 75 Ω), to Vcc. The collector of transistor Q9 is connected, via resistors R20 and R21 (preferably 33 Ω and 300 Ω, respectively) to ground. The resistors R20 and R21 form a voltage divider that provides a voltage at the connection between R20 and R21, which is in turn provided to conductor 308. Resistors R20 and R21 are selected to provide a voltage magnitude less than the voltage at the collector of transistor Q9 by a predetermined shift detection margin (for example, 10% of the voltage at the collector of Q9).

The collector of transistor Q9 is also connected to a peak detection, or peak holding circuit 305. The peak detection circuit 305 includes an NPN transistor Q11. The base of transistor Q11 is connected to the collector of transistor Q9 for receiving the larger of the two voltages provided by the voltage divider comprising R20 and R21. The collector of transistor Q11 is connected to Vcc, and the emitter of transistor Q11 is connected to ground via the parallel combination of R22 (5.1 kΩ) and C10 (100 pF). R22 and C10 are selected to provide a time constant (e.g., 5 µs) that is on the order of the response time of the isolation transformer, or more generally, the response time of the preceding stages of the receiver.

R22 and C10 establish the temporal range over which the peak holding circuit 305 maintains a voltage that is representative of the average peak voltage at the collector of transistor Q9. The peak voltage at the collector of transistor Q9, in turn, is proportional to the minimum voltage of the pseudoternary signal at terminal 42a. Thus, the voltage across capacitor C10, which is provided to conductor 310, shall represent the average minimum level of the pseudoternary signal upon conductor 42a.

Conductor 308 is connected with the non-inverting input of a differential amplifier 312. Conductor 310 is connected with the inverting input of differential amplifier 312. The differential amplifier 312 is preferably a saturating comparator, such as a Motorola MC10116 ECL line receiver. The signal on conductor 308 represents the substantially instantaneous level of the inverted pseudoternary signal, reduced by the predetermined detection margin that is established by R20 and R21. The signal on conductor 310 represents the time-averaged peak of the inverted pseudoternary signal. When the minimum value of the pseudoternary signal exhibits a DC level shift within the holding time of the peak detection circuit, and when the level shift exceeds the detection margin, then the voltage on conductor 308 will exceed the voltage on conductor 310 during the excursion in the minimum value of the pseudoternary signal at terminal 42a. Consequently, the differential amplifier 312 produces a shift correction signal that is provided to the signal level is correction circuit 302, via the voltage divider of R23 and R24 (2 kΩ each) over conductor 306. The shift correction signal activates transistor Q7 thereby pulling down the pseudoternary signal on conductor 42a.

In order to ensure that the holding time of the peak detection circuit 305 is longer than the time constant characterizing the shift in the DC level of the received signal, an inductor (not shown) is preferably connected across terminals 26a and 26b of the receiver circuit, in embodiments wherein the DC restoration circuit 300 is employed. The inductor is selected to provide a dominant low-frequency pole in the front-end response of the receiver, (e.g., 1 µs) to ensure that any low frequency variations in the average pseudoternary signal baseline will be maintained within the holding time of the peak detection circuit. Additionally, a 1 nF capacitor, C11, is connected between conductors 306 and 306' in order to match the impulse response of the DC restoration circuit to the impulse response of the front end of the receiver circuit.

Figure 4:
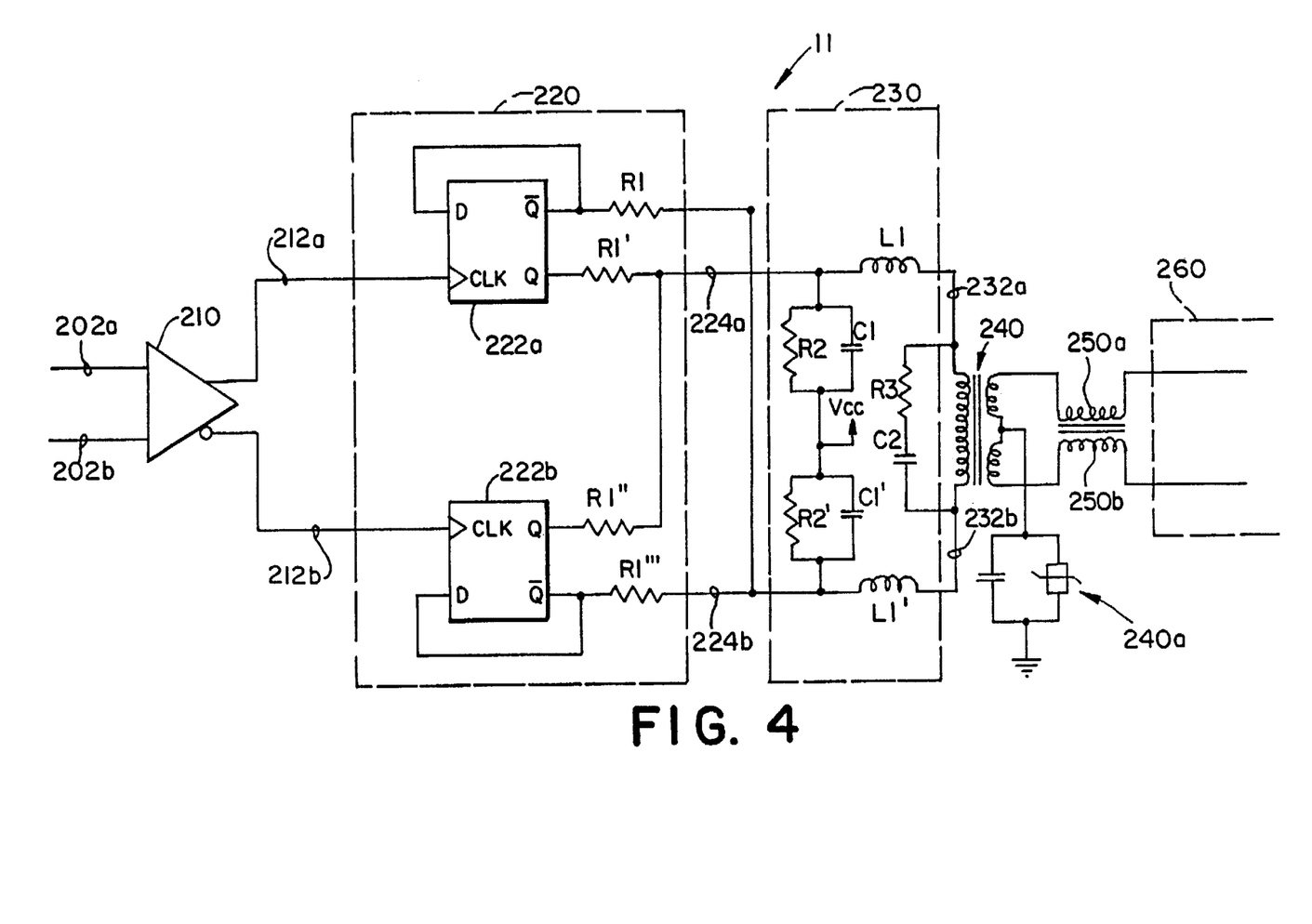
FIG. 4 is a schematic diagram of a transmitter section of an embodiment of the high speed data transceiver according to the present invention.

The receiver circuit of the present invention is preferably packaged together with a transmitter circuit in order to provide a transceiver module that is capable of not only receiving, but also transmitting differential pseudoternary signals. A suitable transmitter circuit 11 is shown in FIG. 4. The transmitting circuit receives a binary logic signal at terminals 202a and 202b and generates a differential pseudoternary for transmission over a metallic conductive medium 260, e.g., a UTP cable. Terminals 202a and 202b are connected to the inputs of a buffer amplifier 210 having an inverting output and a non-inverting output. The buffer amplifier 210 converts the binary input signal into a differential binary signal which is then provided to a conversion circuit over conductors 212a and 212b.

The conversion circuit 220 includes two toggle circuits 222a and 222b, which are preferably Motorola 74AC74 positive-edge-triggered D-type latches. Conductor 212a is connected with the clock input of toggle circuit 222a. Conductor 212b is connected with the clock input of toggle circuit 222b. The inverted outputs of the toggle circuits are connected with the respective D-inputs so that the toggle circuits will each produce a logic level transition whenever a low to high transition is applied to the respective clock inputs.

The non-inverting output of each toggle circuit is connected with conductor 224a via respective resistors R1' and R1", which are preferably 100 Ω resistors. The resistors R1' and R1" provide a mid-level voltage which is necessary to define a reference voltage for producing pseudoternary code. For example, the voltage level on conductor 224a will be at a low logic level whenever both non-inverting outputs of toggle circuits 222a and 222b are low. The voltage level at conductor 224a will be at a high logic level whenever the non-inverting outputs of toggle circuits 222a and 222b are high. Whenever the non-inverting outputs of the toggle circuits are at opposite logic levels, the resistors R1' and R1" provide a voltage divider that results in a mid-level voltage on conductor 224a. Successive transitions of the differential binary signal on conductors 212a and 212b cause the conversion circuit 220 to act as a three-level sequential circuit. The inverting outputs of toggle circuits 222a and 222b are connected to conductor 224b via respective resistors R1 and R1''' in a similar manner.

Figure 5A:
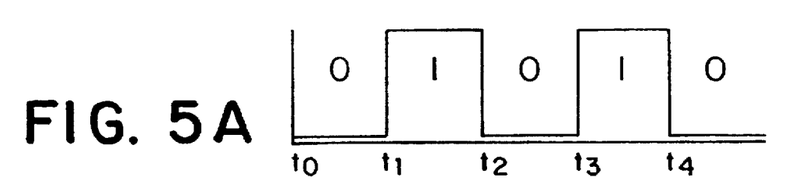
FIGS. 5A–5D are graphs of electrical signals illustrating a signal conversion process performed by the transmitter section of FIG. 4.
Figure 5B:
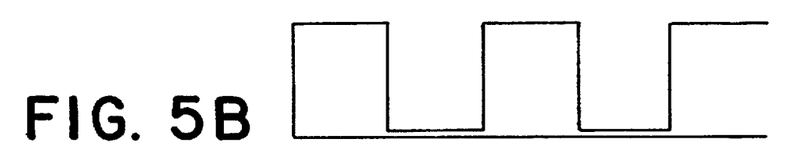
Figure 5C:
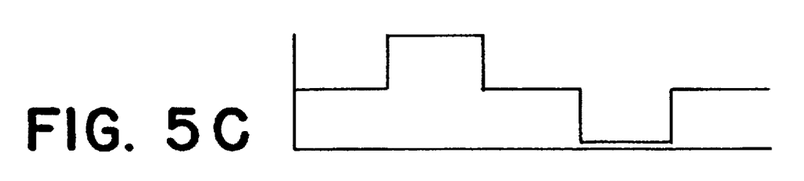
Figure 5D:
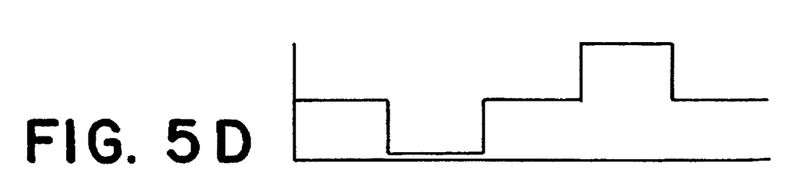

The operation of the conversion circuit 220 is illustrated in FIGS. 5A–D. FIG. 5A shows a waveform corresponding to the sequence 01010 on conductor 212a. FIG. 5B shows the corresponding complementary waveform on conductor 212b. FIG. 5C shows the resulting waveform on conductor 224a, and FIG. 5D shows the resulting waveform on conductor 224b. Beginning at time $t_0$, the non-inverting output of toggle circuit 222a is low and the non-inverting output of toggle circuit 222b is high, hence the signals in FIGS. 5C and 5D are both at mid-level. At time $t_1$, the signal in FIG. 5A, representing the signal on conductor 212a, changes from low to high. The positive edge on the clock input of toggle circuit 222a causes toggle circuit 222a to latch its inverting output thus driving its non-inverting output high. The negative transition on conductor 212b causes no change in the condition of toggle circuit 222b. Since the noninverting outputs of the toggle circuits are both high at $t_1$, the signal in FIG. 5C, representing the signal on conductor 224a is driven from mid-level to high. The signal in FIG. 5D, representing the signal on conductor 224b is driven low by the low condition of both of the inverting outputs of the toggle circuits.

Subsequently, at $t_2$, the voltage 5A on conductor 212a makes a high-to-low transition. This transition causes no change in the status of toggle circuit 222a. The corresponding upward transition of voltage 5B on conductor 212b causes toggle circuit 222b to latch its low inverting output, thus driving the non-inverting output low and the inverting output high. The result is that the voltages 5C and 5D are again driven to mid-level. Upon the next upward transition of voltage 5A at $t_3$, the non-inverting output of toggle circuit 222a is driven low while the non-inverting output of toggle circuit 222b remains low.

As can be seen from FIGS. 5A–5C and the foregoing description, the conversion circuit 220 provides a differential pseudoternary encoder wherein successive low-to-high transitions on conductor 212a result in alternating mid-to-high and mid-to-low transitions on conductor 224a with complementary transitions appearing on conductor 224b.

Among the advantages of conversion circuit 220 relative to known binary-to-pseudoternary circuits is that the gate propagation delay from conductor 212a to conductors 224a and 224b is equal to the gate propagation delay from conductor and 212b to conductors 224a and 224b. Hence, the resulting pseudoternary signal exhibits superior transition symmetry and pulse width uniformity than known pseudoternary conversion circuits.

The differential pseudoternary signal on conductors 224a and 224b is input to a filter network 230. Filter network 230 includes a fixed three-pole filter for attenuating high harmonic components of the differential pseudoternary signal and for matching the output impedance of the transmitter circuit 11 to the impedance of the conductive medium 260. Such high harmonic components cause undesirable high-frequency electromagnetic emissions during data transmission. One pole of filter network 230 is provided by a pair of RC filters connected in series across conductors 224a and 224b. The RC filters are connected to Vcc at their common connection. The RC filters each include a resistor R2, preferably having a value of 50 Ω and a capacitor C1, preferably having a value of 30 pF. Another pole of filter network 230 includes a pair of inductors L1, L1', preferably having a value of 100 nH and connected in series with respective conductors 224a and 224b. A third pole is provided by a resistor R3, preferably having a value of 50 Ω, and a capacitor C2 having a value of 15 pF which are connected in series across terminals 232a and 232b.

The filtered differential pseudoternary signal is provided at terminals 232a and 232b of filter network 230, and are in turn input to isolation transformer 240. The output terminals of isolation transformer 240 are connected to series chokes 250a and 250b which are in turn connected to the metallic conductive medium 260. The structure and functions of the isolation transformer 240 and its associated surge protection and decoupling circuit, the series chokes 250a and 250b, and the conductive medium 260 are substantially identical to the similar arrangement of components described in connection with the input stage of receiver 9 of FIG. 1B.

The terms and expressions which have been employed in the foregoing are used as terms of description and not of limitation, and there is no intention in the use of such terms and expressions of excluding any equivalents of the features shown and described, or portions thereof, but it is recognized that various modifications are possible within the scope of the invention claimed.

That which is claimed is:

1. An apparatus for receiving a differential multi-level signal from an electrically conductive medium, comprising:
    an isolating transformer having a primary winding and a secondary winding, said primary winding being adapted for connection with the electrically conductive medium for receiving the multi-level signal;
    a first equalizer operatively connected to said isolating transformer for receiving the multi-level signal, said first equalizer providing at least partial compensation for distortion of the multi-level signal by the electrically conductive medium, whereby said first equalizer produces an equalized multi-level signal;
    a signal conversion circuit operatively connected to receive the equalized multi-level signal, said signal conversion circuit comprising a differential rectifier for converting the equalized multi-level signal to a differential binary signal;
    a second equalizer operatively connected to said signal conversion circuit for receiving the differential binary signal, and providing compensation for distortion in the differential binary signal; and
    a conversion amplifier connected to receive said differential binary signal from the second equalizer, for converting the differential binary signal to a binary signal therefrom.

2. The apparatus as recited in claim 1 wherein the multi-level signal is a differential multi-level signal composed of a complementary pair of multi-level signals and the differential rectifier in said signal conversion circuit comprises first and second switching networks responsive to the differential multi-level signal for providing a positive-going signal in response to a positive-going transition in either of the pair of complementary multi-level signals and a negative-going signal in response to a negative-going transition in, either of the complementary multi-level signals, whereby the differential binary signal is provided by said signal conversion circuit.

3. An apparatus for receiving a differential multi-level signal from an electrically conductive medium, the apparatus comprising:
    an isolating transformer having a primary winding and a secondary winding, said primary winding being adapted for connection with the electrically conductive medium for receiving the multi-level signal;
    a first equalizer operatively connected to said isolating transformer for receiving the multi-level signal, said first equalizer comprising a high-pass filter and a non-linear equalizing circuit connected to receive the multi-level signal from said high-pass filter, said non-linear equalizing circuit being formed to provide attenuation of high frequency components of the multi-level signal in a manner that is dependent on the amplitude of the multi-level signal, the first equalizer providing at least partial compensation for distortion of the multi-level signal by the electrically conductive medium, whereby said first equalizer produces an equalized multi-level signal;
    a signal conversion circuit operatively connected to receive the equalized multi-level signal, said signal conversion circuit comprising a differential rectifier for converting the equalized multi-level signal to a differential binary signal; and
    a conversion amplifier connected to receive said differential binary signal for converting the differential binary signal to a binary signal therefrom.

4. The apparatus of claim 3 wherein the first equalizer comprises a pair of conductors for conducting respective signal components of the differential multi-level signal, and wherein the non-linear equalizing circuit comprises a threshold voltage conduction device and a capacitor connected in series between the pair of conductors, whereby selected high frequencies of the differential multi-level signal are attenuated when the amplitude of the differential multi-level signal exceeds a predetermined threshold level.

5. An apparatus for receiving a differential multi-level signal from an electrically conductive medium, the apparatus comprising:

an isolating transformer having a primary winding and a secondary winding, said primary winding being adapted for connection with the electrically conductive medium for receiving the multi-level signal;

a first equalizer operatively connected to said isolating transformer for receiving the multi-level signal, said first equalizer providing at least partial compensation for distortion of the multi-level signal by the electrically conductive medium, whereby said first equalizer produces an equalized multi-level signal;

DC restoration means operatively coupled to said first equalizer for restoring a desired DC bias to the multi-level signal;

a signal conversion circuit operatively connected to receive the equalized multi-level signal, said signal conversion circuit comprising a differential rectifier for converting the equalized multi-level signal to a differential binary signal; and a conversion amplifier connected to receive said differential binary signal for converting the differential binary signal to a binary signal therefrom.

6. The apparatus of claim 5 wherein said DC restoration means comprises monitoring means for monitoring an average level of the multi-level signal and for generating a correction signal in response thereto.

7. The apparatus of claim 6 wherein said isolating transformer comprises a control winding operatively connected to said monitoring means whereby said monitoring means provides the correction signal to said control winding of said transformer.

8. The apparatus as recited in claim 7 wherein the first equalizer comprises a high pass filter and a non-linear equalizing circuit connected to receive the multi-level signal from said high-pass filter, said non-linear equalizing circuit being formed to provide attenuation of high frequency components of the multi-level signal in a manner that is dependent on the amplitude of the multi-level signal.

9. The apparatus of claim 6 wherein said DC restoration means comprises a correction circuit operatively connected to said monitoring means for receiving the correction signal, and for applying a bias to the equalized multi-level signal in response to the correction signal.

10. The apparatus of claim 9 wherein said monitoring means comprises:

(a) a peak detector for detecting a peak level of the multi-level signal and for averaging the peak level over a pre-determined time interval;

(b) a comparator for comparing the average peak level of the multi-level signal with a corresponding instantaneous level of the multi-level signal, said comparator producing the correction signal when the instantaneous level exceeds the average peak level.

11. The apparatus of claim 10 wherein said comparator produces the correction signal in response to the instantaneous level exceeding the average peak level by a pre-determined correction margin.

12. An apparatus for receiving a signal from an electrically conductive medium, the signal having a balanced component, including a differential multi-level signal, and a common-mode component, the apparatus comprising:

an isolating transformer adapted for connection to the electrically conductive medium for providing the balanced component as a complementary pair of multi-level signals at its secondary terminals;

a first equalizing network connected to receive the complementary pair of multi-level signals for providing at least partial compensation for distortion thereof induced by the electrically conductive medium;

a differential decoder responsive to the complementary pair of multi-level signals, said differential decoder including first and second complementary amplifier networks, said first complementary amplifier network being connected to receive the complementary pair of multi-level signals for producing a positive-going signal in response to a positive-going transition in either of the pair of complementary multi-level signals, and said second complementary amplifier network connected to receive the complementary pair of multi-level signals for producing a negative-going signal in response to a negative-going transition in either of the pair of complementary multi-level signals, whereby said differential decoder provides a differential binary signal;

a second equalizing network operatively connected to said differential decoder for receiving the differential binary signal and providing compensation for distortion in the differential binary signal; and a limiting differential amplifier connected to receive the differential binary signal from the second equalizing network for converting the differential binary signal into a binary signal.

13. The apparatus as recited in claim 12 wherein the first equalizing network comprises a high-pass filter and a non-linear equalizing circuit connected to receive the complementary pair of multi-level signals from said high pass filter, said non-linear equalizing circuit being formed to provide attenuation of high frequency components of the complementary pair of multi-level signals in a manner that is dependent on the amplitude of the multi-level signal.

14. The apparatus as recited in claim 12 further comprising DC restoration means operatively coupled to said first equalizing network for restoring a zero DC bias to the differential multi-level signal.

15. The apparatus as recited in claim 14 wherein said DC restoration means comprises:

(a) monitoring means for monitoring an average level of the multi-level signal; and (b) comparing means for comparing the average level with a corresponding instantaneous level of the-multi-level signal, and for generating a correction signal when the average level differs from the instantaneous level by a pre-determined margin of correction.

16. The apparatus as recited in claim 15 wherein said monitoring means is adapted for monitoring the average level of the multi-level signal over a time interval that is larger than a time constant characterizing a dominant pole of the isolating transformer and said first equalizing network.

17. The apparatus as recited in claim 16 wherein said first equalizing network is adapted to provide the dominant pole.

18. A data receiver circuit, for receiving pseudoternary line-coded data signals, comprising:

(a) an equalizer for correcting distortion in the line-coded signals and for producing equalized pseudoternary signals therefrom;

(b) a differential decoder having an input terminal connected with said equalizer for producing binary signals in response to the equalized pseudoternary signals; and (c) a restoration circuit connected with the input of said differential decoder for detecting a shift in an average level of the equalized pseudoternary signals and for applying a counteracting bias to the equalized pseudoternary signals in response to the shift.

19. The data receiver circuit of claim 18 wherein said restoration circuit comprises:

(a) an averaging circuit for holding the average level of the equalized pseudoternary signal; and (b) comparing means for comparing the average level with a corresponding instantaneous level of the signal, and for producing a correction signal indicative of a significant difference between the average level and the instantaneous level.

20. The data receiver circuit of claim 19 wherein said comparing means is formed to generate the correction signal when the instantaneous level differs from the average level by a pre-determined threshold.

21. The data receiver circuit of claim 19 wherein said restoration circuit comprises a bias correction circuit for receiving the correction signal and providing the counteracting bias to the equalized pseudoternary signals.

22. The data receiver circuit of claim 19 wherein said averaging circuit is arranged for holding an average peak level of the equalized pseudoternary signals.

* * * * *